May 5, 1970 H. SCHÖNFELDER 3,510,572

METHOD OF AND APPARATUS FOR THE GRADATION CORRECTION OF COLOR TELEVISION SIGNALS

Filed July 25, 1966

Inventor:

Helmut Schönfelder

United States Patent Office 3,510,572

Patented May 5, 1970

3,510,572

METHOD OF AND APPARATUS FOR THE GRADATION CORRECTION OF COLOR TELEVISION SIGNALS

Helmut Schönfelder, Darmstadt, Germany, assignor to Fernseh GmbH, Darmstadt, Germany Filed July 25, 1966, Ser. No. 567,687
Claims priority, application Germany, July 28, 1965, F 46,726
Int. Cl. H04n 9/04
U.S. Cl. 178—5.4 11 Claims

ABSTRACT OF THE DISCLOSURE

A method and apparatus for generating a gradation-corrected color television luminance signal, in which the color component signals representing red, green and blue components of the scene scanned, are applied to individual gradation correctors from signal sources developing these color component signals. The outputs of the gradation correctors are applied to a color matrix device which provides a luminance signal composed of predetermined proportions of the corrected color component signals. After passing through a low-pass filter, the luminance signal from the matrix device is added to a signal taken from one of the signal sources and passed through a high-pass filter having a characteristic which is complementary to that of the low-pass filter.

Figure 1:
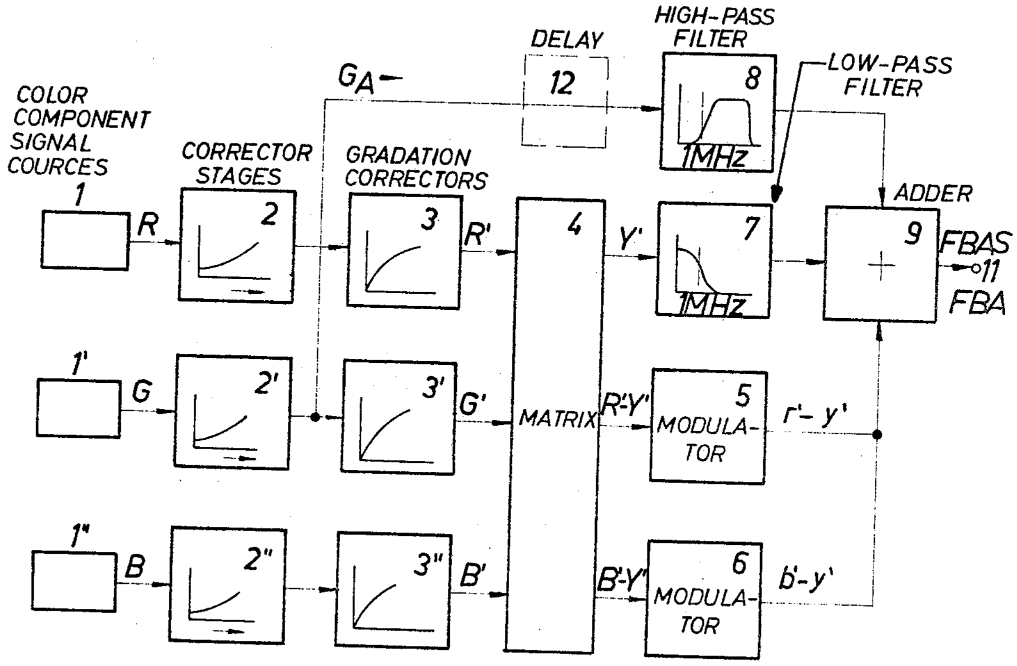

The present invention relates to an improved method for the gradation correction of color television signals.

The amplitude of the video signal generated in the operation of a monochrome television system, corresponds to a succession of light-intensity values. If non-linear distortions occur in the conversion of these light-intensity values into video signal amplitudes and vice versa, due to the non-linear characteristics of the pick-up and reproducing devices, then the light intensity transmission of the television system varies. The non-linear distortions may be diminished if certain amplitude ranges as, for example, those corresponding to the dark gray tones of the video signal, are amplified more than other amplitude ranges as, for example, those corresponding to the light gray tones, by means of gradation correctors. In this arrangement, however, the noise level in the amplified ranges of amplitude will be increased. In order to avoid this disadvantage, a known method provides that the lower frequency components of the video signal only be led through a gradation corrector. The higher frequency components of the video signal, on the other hand, are mixed with the corrected lower frequency components. In this manner the more disturbing non-linear distortions are compensated without the noise level being raised.

As commonly known in the field of color television technology, three video signals corresponding to the primary colors red, green and blue, are derived at any one time. It is also known that non-linear distortion may be reduced through the use of a gradation corrector for each signal, so that the noise level in the amplified amplitude ranges is then raised in a manner similar to monochrome television. The high noise frequencies of the luminance signal are thus added to the modulated color difference signal and applied to a decoder in the color television receiver apparatus. In the color demodulator of this decoder, the noise frequencies are demodulated and become clearly visible as the modulated noise components of relatively high level. Thus, in the transmission of color television pictures, the noise components are more disturbing than in the transmission and display of monochrome pictures.

The prior art teaches a method whereby the lower frequency components only of each chrominance signal is transmitted over a first channel with a gradation corrector, the higher frequency components are transmitted over a second channel, and the frequency components of the two channels are then added. In such an arrangement a high-pass and a low-pass filter is necessary for each color component signal. While it is, in fact, possible to reduce thereby the non-linear distortions, this method is uneconomical because three high-pass filters and three low-pass filters are required. In addition, this method has the further disadvantage that the three high-pass filters and the three low-pass filters must be matched with respect to their complementary characteristics. Such matching procedure is exceedingly laborious and time-consuming.

Accordingly, an object of the present invention is to provide an arrangement and method for producing frequency dependent gradation corrections, in an economical and simple manner.

Another object of the present invention is to provide an arrangement and method, as set forth, which is based on standard constructed circuit elements.

Yet another object of the present invention is to provide an arrangement and method, of the character described whereby the reproduced color picture disturbing noise components are substantially invisible.

A further object of the present invention is to provide an arrangement and method, as set forth, which produces a color video signal (FBA) or a composite color signal (FBAS) when used in conjunction with synchronizing signals.

A still further object of the present invention is to provide an arrangement and method, as set forth, which is applicable to all systems of color television transmission in which a luminance signal and a sub-carrier signal modulated with chrominance information are added and transmitted together.

With the preceding objects in view the present invention provides a method for generating a gradation-corrected television luminance signal comprising the steps of generating a plurality of uncorrected color component signals representing respective color components of a scanned scene, applying gradation correction individually to the color component signals to develop respective corrected color component signals applying all the corrected color component signals to a color matrix device to develop a luminance signal composed of predetermined proportions of each of the corrected color component signals, suppressing all but a predetermined lower-frequency range of components of said luminance signal and combining the predetermined components of the luminance signal with complementary higher-frequency components of a further signal derived from one at least of the uncorrected color component signals to provide a corrected luminance signal in which the lower frequency components, but not the higher frequency components, have been subjected to gradation correction.

The preceding method, according to the invention, has the advantageous feature that permits non-linear distortions in the transmission of a color picture to be substantially avoided without the expenditure of substantial structural means. The method, according to the invention, is also advantageous from the viewpoint that the reproduced color picture disturbing noise components are substantially not visible. This is due to the condition that the signal from which the higher frequency components are derived, i.e., either the color component signal representing the color green or an uncorrected luminance signal, is derived before the gradation correction is applied. Thus, the noise components are not amplified in the relevant gradation corrector, but are added to the modulated color difference signals at a relatively low level and transmitted to the demodulator where, because of the relatively low level of the demodulated noise components, no disturbance arises. In addition, the low level of the noise components in the reproduced color picture, is made possible because in many cases the color component signal representing the color green which is applied to the high-pass filter, as associated with a smaller noise component than those associated with the color component signals representing the colors red and blue.

Figure 2:
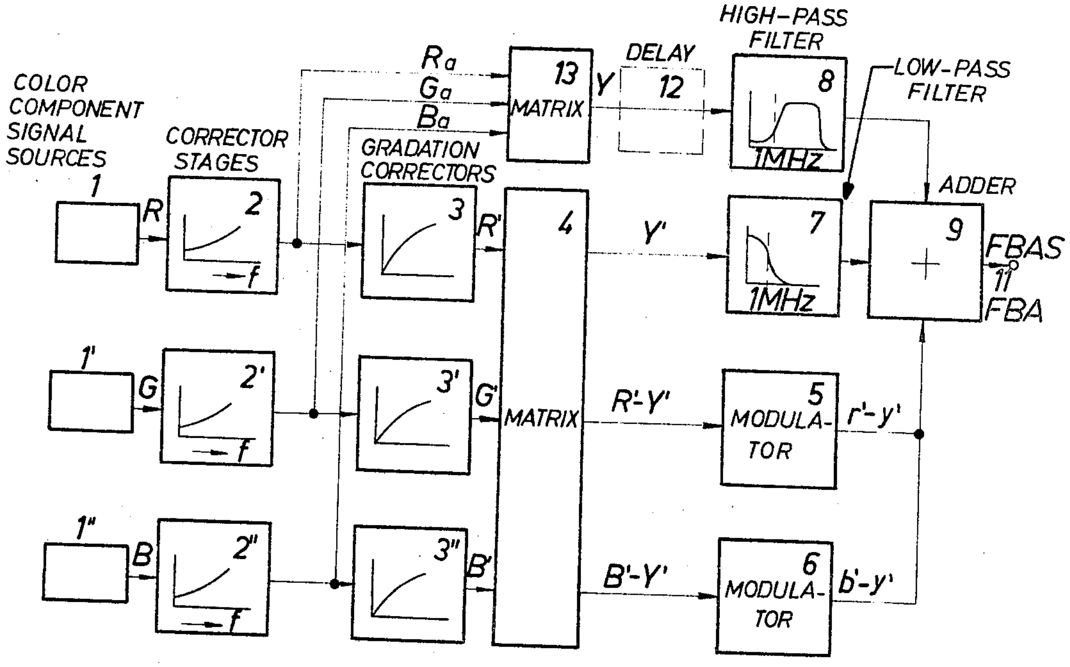

The novel features which are considered as characteristic for the invention are set forth in particular in the appended claims. The invention itself, however, both as to its additional objects and advantages thereof, will be best understood from the following description of specific embodiments when read in connection with the accompanying drawings, in which:

FIG. 1 is a schematic diagram showing the interconnection of standard circuit elements for obtaining an arrangement and method for gradation correction of color television signals, in accordance with the objects of the present invention; and FIG. 2 is a schematic diagram showing another embodiment of the arrangement of FIG. 1.

Referring to the drawing, the circuit arrangement for frequency-dependent gradation correction of color television signals, as shown in FIG. 1, employs color component signal sources 1, 1' and 1''. These signal sources may be in the form of television pickup tubes in a color camera or photocells in a flying-spot scanner for the purpose of developing color component signals R, G and B, representing the values of the primary colors, red, green and blue in the scanned image, respectively. These color component signals are applied, by way of corrector stages 2, 2' and 2'', respectively, to individual gradation correctors 3, 3' and 3''. The gradation-corrected color component signals R', G' and B' taken from these gradation correctors, are applied to a matrix 4 which produces a luminance signal Y' composed of 30%, 59% and 11% of the color component signals R', G' and B', respectively. The color matrix 4 also generates the color difference signals $(R'-Y')$ and $(B'-Y')$ which are applied respectively to the modulator stages 5 and 6.

The corrector stages 2, 2' and 2'' function to amplify the higher frequency components of the video signals in contrast to the lower frequency components. This results in a picture with improved resolution. The circuitry for these corrector stages are fully described in the article by R. C. Dennison in RCA Review, December 1953, pp. 569–585, "Aperture Compensator for Television Cameras." The gradation correctors 3, 3' and 3'', are completely described in the book "Color Television Engineering," by J. W. Wentworth, McGraw-Hill Book Company, New York, 1955, Figs. 10–29 on p. 314. The matrix 4 is represented in Figs. 10–43 on p. 330 of the aforementioned book. In matrix 4, the three color components R', G' and B' are algebraically processed to produce their sum Y', the difference $(R'-Y')$, and the difference $(B'-Y')$. The quantities Y', $(R'-Y')$ and $(B'-Y')$ correspond respectively to the designations M, —I, and Q in the preceding book by Wentworth. The modulators 5 and 6 are illustrated in Figs. 10–44 on p. 332 of Wentworth's book. The modulators 5 and 6 are associated, in this reference, with the designation —I and Q which are equivalent to the differences $(R'-Y')$ and $(B'-Y')$, as already indicated.

In order to effect frequency-dependent gradation corrections, the frequency components of the luminance signal Y', which exceed a predetermined cut-off frequency as, for example, 1 megacycle per second, are suppressed by means of a low-pass filter 7. The green color component G, on the other hand, is routed directly from the output of stage 2' to a high-pass filter 8. Thus, this particular signal $G_A$ is applied to the high-pass filter 8 without undergoing gradation correction by the circuit 3'. The high-pass filter 8 suppresses the lower frequencies, in the color component signal $G_A$, which are lower than the predetermined cut-off frequency of 1 megacycle per second.

The outputs of the circuits 5, 6, 7 and 8 are applied to a commonly-known adding circuit 9. The adding circuit thus produces the sum of the higher frequencies of the color component signal $G_A$, the lower frequencies of the luminance signal Y', and the modulated color difference signals $(r'-y')$ and $(b'-y')$. At the output terminal 11 of the adder 9, therefore, appears a color video signal FBA or a composite color signal FBAS. The characteristic of the high-pass filter 8 is complementary to that of the low-pass filter 7. In the transmission channel for the high-pass filter 8, a delay stage 12 may be arranged in order to delay the color component signal $G_A$ so that it possesses substantially zero phase shift with reference to the luminance signal Y' and to the modulated color difference signals $(r'-y')$ and $(b'-y')$. It is essential that the color component signal $G_A$ be derived from a point in the transmission channel between the color component signal source 1' and the gradation corrector 3'. Thus, it is important that $G_A$ not be taken from a point subsequent to the gradation corrector, since only in the former arrangement is a substantial improvement obtained in the signal-to-noise ratio. Such improvement is based on the condition that when the color component signal $G_A$ is derived from a point prior to the gradation corrector 3', the noise components of the color component $G_A$ are not amplified. The noise components of the color component $G_A$ are consequently transmitted by the high-pass filter 8 at a relatively low level and they are then added in the circuit 9 to the modulated color difference signals $(r'-y')$ and $(b'-y')$. The FBA or FBAS signal, realized in this manner, may be transmitted from an output terminal 11 to a demodulator (not shown).

Due to the relatively low level of the demodulated noise component of the signal within the demodulator, almost no interference is produced. In addition, the color component signal $G_A$ is, in many cases, accompanied by smaller noise components than the color component signals R and B, and this may also account for the low noise level in the reproduced color picture.

There is a known process which improves the definition of monochrome television pictures when color television signals are displayed on a picture screen for the purpose of reproducing a monochrome image. As commonly known, registration errors may arise between these three color component signals R, G and B, and this may result in a diminution of the definition. In accordance with this known method, the corrected color component signal G' is derived from the output of the gradation corrector 3', and is applied to the high-pass filter. As a result of this arrangement, the noise component of the color component signal G are, therefore, amplified in gradation corrector 3'. Such amplification of the noise components has a deleterious effect upon the picture displayed on the screen of the monochrome receiver to which the signal is applied.

In the embodiment of FIG. 2 the color component signals R, G and B are derived from color picture signal sources 1, 1' and 1'', respectively, in a manner similar to that described for the embodiment of FIG. 1. These color signal components R, G and B are also applied to corrector stages 2, 2' and 2'', respectively, in a similar fashion. The embodiment of FIG. 2 differs from that of FIG. 1 in the respect that the color component signal G is not alone applied to the high-pass filter 8. In the arrangement of FIG. 2 all three color component signals R, G and B are routed from the outputs of the corrector stages and applied to a further matrix 13. The latter processes these components $R_a$, $G_a$ and $B_a$ and produces a further luminance signal Y consisting of 30%, 59% and 11% of the color component signals R, G and B, respectively. The luminance signal Y is applied to the high-pass filter 8 which serves to suppress the lower frequency components below 1 megacycle. The adder 9 serves to add the higher frequency components of the luminance signal Y to the modulated color difference signals $(r'-y')$, $(b'-y')$ and the lower frequency components of the luminance signal Y'. At the output terminal 11 of the adder 9, color video signal FBA or composite color signal FBAS may be obtained. A delay stage 12 may be arranged in the transmission channel between circuits 13 and 8 in order to delay the luminance signal Y so that it has no substantial phase difference from the remaining signals applied to the adder 9. The matrix 13 is a resistor network, an example of which, is shown in FIG. 7–4 on p. 184 of the aforementioned book by Wentworth.

Not only can aperture correction be effected in the corrector stages 2, 2' and 2'', but a boost in the frequency characteristic may be effected in the preamplifier of the color camera. By resorting to measures of this type, the level of the higher frequency noise component of the signals R, G and B, is raised. The higher these noise components are boosted, the greater is the advantage that may be gained through the use of the present invention. In particular, the invention is especially advantageous in applications wherein the signal sources 1, 1' and 1'' are pick-up tubes of the plumbicon or vidicon type, or photocells of a flying spot scanner.

While the invention has been illustrated and described as embodied in degradation correction of color television signals, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method for generating a gradation-corrected color television luminance signal comprising the steps of generating a plurality of uncorrected color component signals representing respective color components of a scanned scene, said color component signals having frequency components below and above a predetermined frequency limit, applying gradation correction individually to all of said color component signals to develop respective corrected color component signals, applying all said corrected color component signals to a color matrix device to develop a luminance signal composed of predetermined proportions of each of said corrected color component signals, suppressing said frequency components of said luminance signal above said predetermined frequency limit and combining said luminance signal with said frequency components above said predetermined frequency limit suppressed with complementary frequency components above said frequency limit of a further signal derived from at least one of said uncorrected color component signals to provide a corrected luminance signal wherein only the frequency components below said frequency limit have been subjected to gradation correction.

2. A method in accordance with claim 1 wherein said further signal comprises that one of said uncorrected color component signals which provides the major proportion of said luminance signal.

3. A method in accordance with claim 1 wherein said further signal comprises an uncorrected luminance signal composed of said predetermined proportions of said uncorrected color component signals.

4. A method in accordance with claim 1 wherein said color component signals represent the primary colors, red, green and blue.

5. A method in accordance with claim 1 including the step of subjecting said further signal to delay such as to ensure that no substantial phase difference exists between the signal components combined to form said corrected luminance signal.

6. Apparatus for generating a gradation-corrected color television luminance signal, comprising signal sources developing respectively color component signals representing the red, green and blue components of a scanned object, individual gradation correctors each fed with a respective one of said color component signals and yielding respective corrected color component signals, a color matrix device fed with said corrected color component signals and yielding a luminance signal composed of predetermined proportions of said corrected color component signals, a low-pass filter connected in the path of said luminance signal from said matrix device to an adding stage, and a high-pass filter having a characteristic complementary to that of said low-pass filter and connected in a signal path from at least one of said signal sources to said adding stage.

7. Apparatus in accordance with claim 6 and including means for applying aperture correction to said generated color component signals between said signal sources and the respective gradation correctors.

8. Apparatus in accordance with claim 6 wherein said signal path from at least one of said signal sources includes further a matrix device having said signal sources connected thereto to develop an uncorrected luminance signal comprising said predetermined proportions of said uncorrected color component signals.

9. Apparatus in accordance with claim 6 wherein said signal path from at least one of said signal sources extends from that signal source providing the color component signal, representing the color green, to said adding stage.

10. Apparatus in accordance with claim 6 in which said signal path from at least one of said signal sources includes a delay device such that no substantial phase difference exists between said corrected luminance signal components and said uncorrected luminance signal components at the input of said adding stage.

11. A method for generating a gradation-corrected color television luminance signal comprising the steps of generating a plurality of uncorrected color component signals representing respective color components of a scanned scene, said color component signals having frequency components below and above a predetermined frequency limit, said color component signals representing the primary colors red, green and blue, applying gradation correction individually to all of said color component signals to develop respective corrected color component signals, applying all said corrected color component signals to a color matrix device to develop a luminance signal composed of predetermined proportions of each of said corrected color component signals, suppressing said frequency components of said luminance signal above said predetermined frequency limit and combining said luminance signal with said frequency components above said predetermined frequency limit suppressed with complementary frequency components above said frequency limit of a further signal derived from at least one of said uncorrected color component signals to provide a corrected luminance signal wherein only the frequency components below said frequency limit have been subjected to gradation, and adding to said gradation-corrected luminance signal further chrominance signals each representing the difference between the values of the respective corrected red and blue color component signals and the corrected luminance signal, each said chrominance signal being modulated in a respective predetermined phase upon a common carrier wave having a frequency within the frequency band of said luminance signal.

References Cited

UNITED STATES PATENTS

| | | | |
|---|---|---|---|
| 3,281,528 | 10/1966 | James | 178—5.4 |
| 3,333,059 | 7/1967 | Davidse | 178—5.4 |

ROBERT L. GRIFFIN, Primary Examiner

R. MURRAY, Assistant Examiner